(12) United States Patent
Jung et al.

(10) Patent No.: US 7,875,828 B2
(45) Date of Patent: Jan. 25, 2011

(54) LASER IRRADIATION APPARATUS

(75) Inventors: Byoung-Hyun Jung, Seoul (KR);
You-Min Cha, Yongin-si (KR);
Won-Woong Jung, Yongin-si (KR);
Youn-Goo Roh, Yongin-si (KR)

(73) Assignee: Samsung Mobile Display Co., Ltd.,
Giheung-Gu, Yongin, Gyunggi-Do (KR)

( * ) Notice: Subject to any disclaimer, the term of this patent is extended or adjusted under 35 U.S.C. 154(b) by 1076 days.

(21) Appl. No.: 11/583,770

(22) Filed: Oct. 20, 2006

(65) Prior Publication Data
US 2007/0211323 A1    Sep. 13, 2007

(30) Foreign Application Priority Data
Mar. 8, 2006   (KR)  ............... 10-2006-0021890

(51) Int. Cl.
*B23K 26/10*    (2006.01)
(52) U.S. Cl. .................... 219/121.78; 219/121.79; 219/121.6
(58) Field of Classification Search .............. 219/121.6; 33/645, 664, 41.1, 558.02; 266/63; 409/206; 74/89.28
See application file for complete search history.

(56) References Cited

U.S. PATENT DOCUMENTS

| | | | | |
|---|---|---|---|---|
| 2,515,498 A | * | 7/1950 | De Craene et al. ............ | 74/520 |
| 2,527,019 A | * | 10/1950 | Marbury, Jr. .................. | 266/77 |
| 3,366,012 A | * | 1/1968 | Richter ....................... | 409/134 |
| 4,985,780 A | * | 1/1991 | Garnier et al. ......... | 219/121.68 |
| 5,560,843 A | * | 10/1996 | Koike et al. ............ | 219/121.48 |
| 6,854,196 B2 | * | 2/2005 | Burrell et al. ............ | 33/558.02 |
| 6,877,236 B1 | * | 4/2005 | Williams ..................... | 33/286 |
| 2003/0180983 A1 | * | 9/2003 | Oswald et al. ................ | 438/57 |
| 2004/0262273 A1 | | 12/2004 | Nam et al. | |
| 2005/0001545 A1 | | 1/2005 | Aitken et al. | |

FOREIGN PATENT DOCUMENTS

| | | | |
|---|---|---|---|
| JP | 5-69170 | | 3/1993 |
| JP | 7-185859 | | 7/1995 |
| JP | 08245190 A | * | 9/1996 |
| JP | H09-239578 | | 9/1997 |
| JP | 2000-5891 | | 1/2000 |

(Continued)

OTHER PUBLICATIONS

Korean Office Action for Korean Patent Application No. 2006-0021890 issued on Feb. 26, 2007.

(Continued)

*Primary Examiner*—Quang T Van
*Assistant Examiner*—Jianying Atkisson
(74) *Attorney, Agent, or Firm*—Robert E. Bushnell, Esq.

(57) ABSTRACT

A laser irradiation apparatus includes a plurality of laser heads from which a laser is irradiated, can adjust arranged intervals of the laser heads, and moves freely to irradiate the laser along a shape of a subject. A laser oscillator oscillates a laser. A plurality of laser heads linearly irradiate the laser oscillated by the laser oscillator. A first driving means adjusts arranged intervals of the laser heads, and moves the laser heads in an X direction. A second driving means moves the laser heads in a Y direction different from the X direction.

15 Claims, 5 Drawing Sheets

FOREIGN PATENT DOCUMENTS

| | | |
|---|---|---|
| JP | 2002-254189 | 9/2002 |
| JP | 2002254189 A * | 9/2002 |
| JP | 2003-255552 | 9/2003 |
| KR | 2001-0015682 | 2/2001 |
| KR | 10-2006-0005369 | 1/2006 |
| TW | 095148349 | 10/2007 |

OTHER PUBLICATIONS

European Search Report corresponding to European Patent Application No. 07250965.6-2303, issued on Jul. 16, 2007.

Transmittal letter and Japanese Office action issued on Jul. 7, 2009 in Applicant's corresponding Japanese Patent Application No. 2006-0021890.

Office action from the State intellectual Property Office of P.R. China issued in Applicant's corresponding Chinese Application No. 200710008214.3 dated Mar. 11, 2010.

* cited by examiner

LASER IRRADIATION APPARATUS

CLAIM OF PRIORITY

This application makes reference to, incorporates the same herein, and claims all benefits accruing under 35 U.S.C. §119 from an application for LASER IRRADIATION APPARATUS earlier filed in the Korean Intellectual Property Office on 8 Mar. 2006 and there duly assigned Serial No. 10-2006-0021890.

BACKGROUND OF THE INVENTION

1. Field of the Invention

The present invention relates to a laser irradiation apparatus, widely used for all kinds of industrial purposes, in particular, for a process of manufacturing an organic light emitting display.

2. Description of the Related Art

An organic light emitting diode can emit light by using an energy discharged while an excited molecule generated when a hole and an electron, which are introduced from two opposite electrodes to an organic light emitting layer, are engaged is returning to the ground state, by locating the organic light emitting layer between the two electrodes and applying voltages to the two electrodes. The organic light emitting display is formed on a base substrate, and a sealing substrate covers an upper portion of the organic light emitting diode.

A main subject in manufacturing the organic light emitting diode is to prevent an external air from penetrating a gap between a substrate on which the organic light emitting diode and a sealing substrate. Korean patent publication No. 10-2006-0005369 discloses a method of sealing a gap between the substrate and the sealing substrate by means of a frit. In Korean patent publication No. 10-2006-0005369, after the sealing substrate is coated with the frit and sintered, and aligned on a base substrate, a laser is irradiated to the frit to seal the substrates in such a way that the frit is melted and cured at the base substrate.

In order to efficiently produce a large amount of organic light emitting displays, a plurality of organic light emitting displays are manufactured on one substrate and cut into individual organic light emitting displays. This is called "sheet unit production".

The term "sheet unit production" means a method that forms a plurality of organic light emitting displays on a base substrate sheet having a size corresponding to a formation size of the individual organic light emitting displays, coalesces a sealing substrate sheet with the base substrate sheet, and cuts the coalesced substrates suited to individual devices. At this time, when a frit is used as a sealant, the frit is formed corresponding to a position in which individual display devices will be formed.

A coalesced substrate obtained by coalescing a sealing substrate sheet with a base substrate sheet during a process of manufacturing a conventional organic light emitting display in a sheet unit is shown as follows. A sealant is used as a frit. A coalesced substrate sheet includes a base substrate sheet, a sealing substrate sheet, and frits. A plurality of organic light emitting diodes are formed on the base substrate sheet. The sealing substrate sheet coalesces with the base substrate sheet. The frits are disposed between the base substrate sheet and the sealing substrate sheet, and seals the base substrate sheet and the sealing substrate sheet for every organic light emitting diode.

Here, a laser irradiation apparatus is used to coalesce the frit coated and sintered at the sealing substrate sheet with the base substrate sheet. Since a conventional laser irradiation apparatus includes only one laser head, it separately melts and cures the frits one by one. This consumes great time and cost. The conventional laser irradiation apparatus also includes a laser oscillator, and a controller.

SUMMARY OF THE INVENTION

Accordingly, it is an aspect of the present invention to provide a laser irradiation apparatus, which includes a plurality of laser heads from which a laser is irradiated, can adjust arranged intervals of the laser heads, and moves freely to irradiate the laser along a shape of a subject.

The foregoing and/or other aspects of the present invention are achieved by providing a laser irradiation apparatus including: a laser oscillator for oscillating a laser; a plurality of laser heads for linearly irradiating the laser oscillated by the laser oscillator; a first driving means for adjusting arranged intervals of the laser heads, and for moving the laser heads in an X direction; and a second driving means for moving the laser heads in a Y direction different from the X direction.

Since the laser irradiation apparatus may move a plurality of laser heads suited to intervals and shapes of a plurality of frits formed on a substrate, it may melt and cure the plurality of frit for a laser irradiation time once, thereby saving a manufacturing time and eliminating requirement of additional laser irradiation device according to intervals of the frits.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
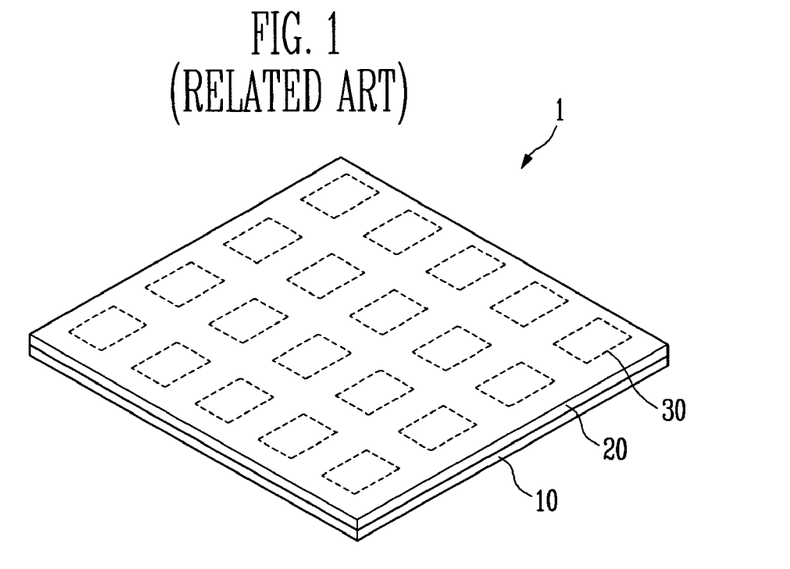
FIG. 1 is a perspective view of a sheet unit substrate before an organic light emitting display is separated into individual devices.

Turning now to the drawings, FIG. 1 is a perspective view showing a coalesced substrate obtained by coalescing a sealing substrate sheet with a base substrate sheet during a process of manufacturing a conventional organic light emitting display in a sheet unit. In FIG. 1, a sealant is used as a frit. As shown in FIG. 1, a coalesced substrate sheet 1 includes a base substrate sheet 10, a sealing substrate sheet 20, and frits 30. A plurality of organic light emitting diodes are formed on the base substrate sheet 10. The sealing substrate sheet 20 coalesces with the base substrate sheet 10. The frits 30 are disposed between the base substrate sheet 10 and the sealing substrate sheet 20, and seals the base substrate sheet 10 and the sealing substrate sheet 20 every organic light emitting diode.

Figure 2:
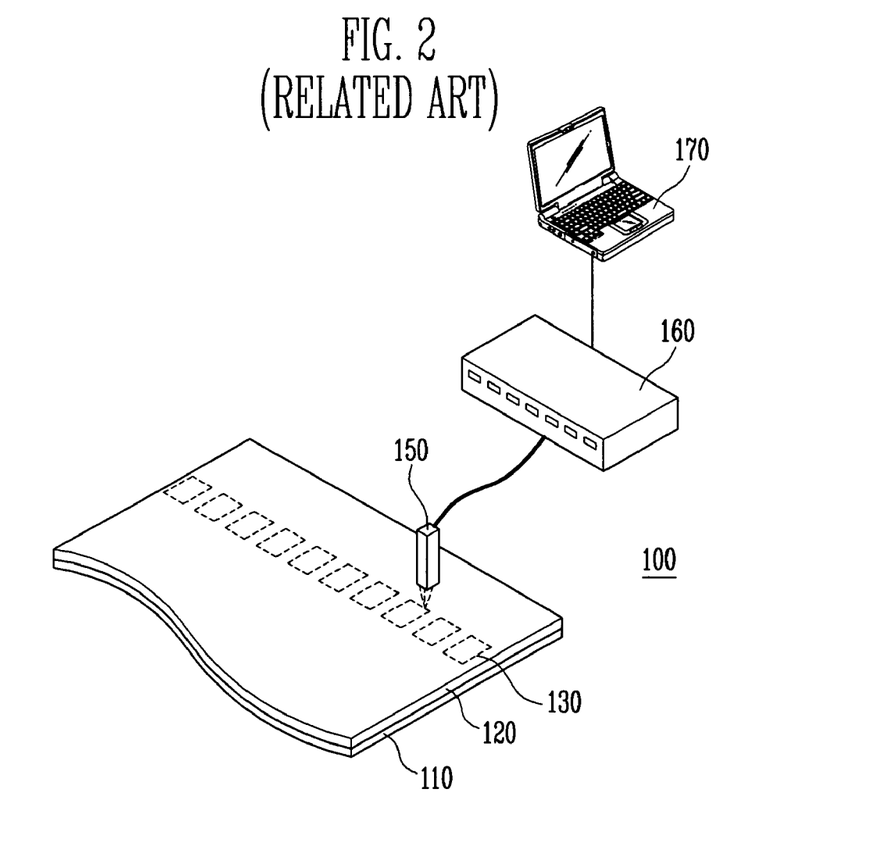
FIG. 2 is a schematic view showing a conventional laser irradiation apparatus.

Here, a laser irradiation apparatus is used to coalesce the frit 30 coated and sintered at the sealing substrate sheet 20 with the base substrate sheet 10. FIG. 2 is a schematic view showing a conventional laser irradiation apparatus 100. Since the conventional laser irradiation apparatus 100 includes only one laser head, it separately melts and cures the frits 30 one by one. This consumes great time and cost. Reference numeral 160 represents a laser oscillator, and reference numeral 170 represents a controller.

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

Figure 3:
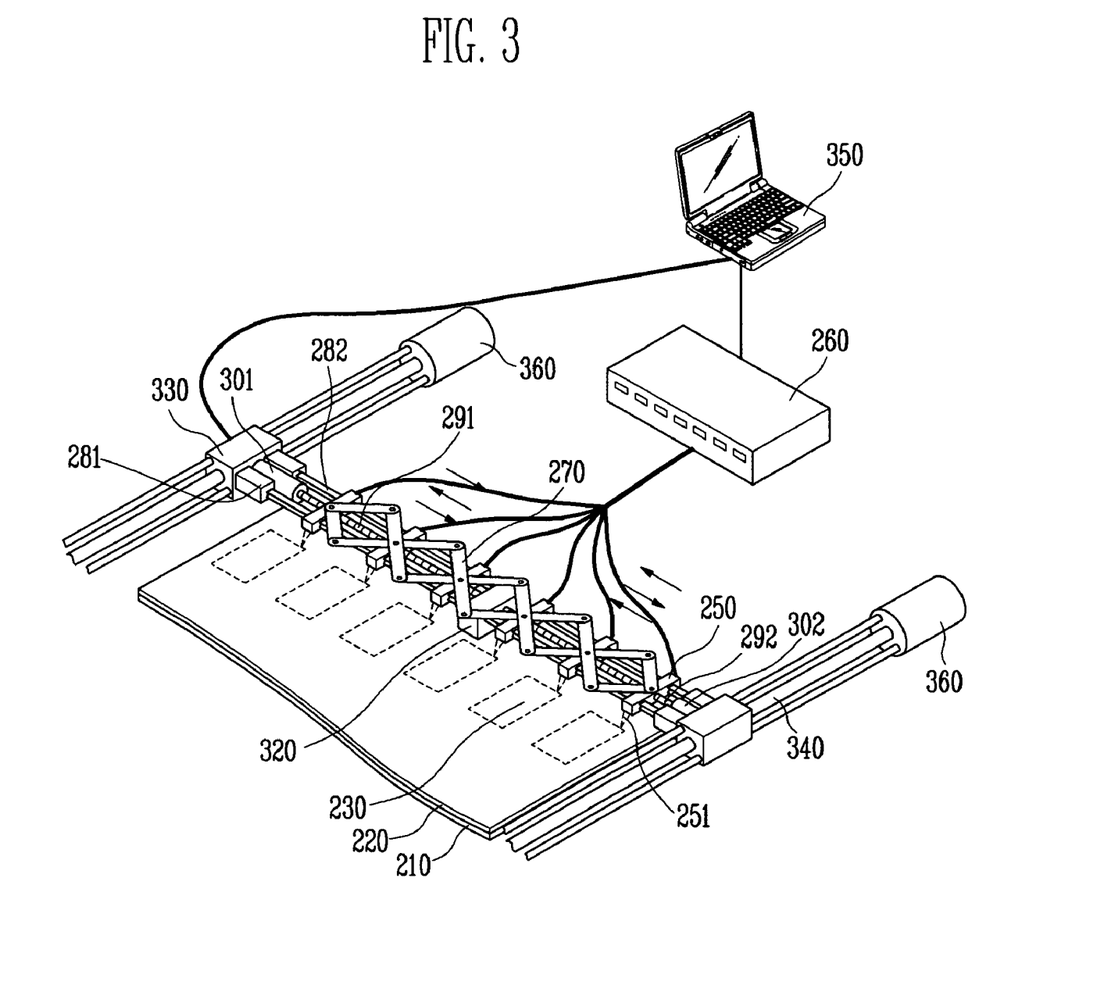
FIG. 3 is a perspective view of a laser irradiation apparatus according to an embodiment of the present invention.

FIG. 3 is a schematic view showing a laser irradiation apparatus according to an embodiment of the present invention. The laser irradiation apparatus includes a laser oscillator 260 and a plurality of laser heads 250. FIG. 3 is a view to explain a principle of the present invention but does not show a connected state of the laser oscillator 260 and the laser heads 250. Here, the laser irradiation apparatus irradiates a laser 251 to a frit 230 from the laser heads 250. The frit 230 is used as a sealant for an organic light emitting display, and is disposed between a base substrate sheet 210 and the sealing substrate sheet 220.

The laser oscillator 260 is a device to generate a laser beam from 800 nm to 1200 nm (nanometers) for melting and curing the frit 230. Each of the laser heads 250 includes an optical system to convert an oscillated laser beam into a linear beam 251. The laser oscillator 260 and the laser heads 250 can be used without limitations in the present invention, and a detailed description thereof is omitted.

In the embodiment of the present invention, although a plurality of the laser heads 250 are arranged in a line, they may be arranged in a plurality of lines. The reason why the plurality of the laser heads 250 are arranged is to cause a laser beam from each laser head 250 to simultaneously melt and cure a plurality of frits 230, which is formed on the coalesced substrate sheet.

On the other hand, the organic light emitting display can be manufactured in various sizes, so that a shape and a size of the frit can vary. Accordingly, so as to irradiate a laser according to the shape of the frit, a driving means is required to adjust intervals of the laser heads and to move the laser heads in at least an X or Y direction.

As a result, the laser irradiation apparatus includes a first driving means or unit, a second driving means or unit, and a controller, which move the laser heads. The first driving means adjusts arranged intervals of the laser heads 250 and drives the laser heads 250 in an X direction so that the laser heads move along a line formed by the frits 230. The X direction is a direction in which the laser head 250 is folded along a cross hanger 270. The first driving means may include a cross hanger 270, two lead screws 291 and 292, two guide bars 281 and 282, and two motors 301 and 302.

The cross hanger 270 includes a plurality of units having an "X" shape or substantially an "X" shape. The units continue to be linked, and folded or unfolded at the same interval. When the laser head is installed at an intersection of the cross hanger 270 to which a plurality of units having the same size are connected, the laser heads 250 can be arranged at the same interval.

The first lead screw 291 and the second lead screw 292 are formed to penetrate the laser heads 250. The first lead screw 291 and the second lead screw 292 are disposed at an extension line of the same straight line. The first lead screw 291 penetrates laser heads 250 located at one side of a connecting member 320, which will be described later, whereas the second lead screw 292 penetrates laser heads 250 located at the other side of the connecting member 320. The first lead screw 291 and the second lead screw 292 are connected to a connecting member 320 to separate from each other. The connecting member 320 connects the first lead screw 291 and said second lead screw 292 to each other while interrupting a supply of power to the first lead screw 291 and the second lead screw 292.

The first and second guide bars 281 and 282 are formed parallel with the first and second lead screws 291 and 292, to penetrate the laser heads 250. When the first and second lead screws 291 and 292 rotate, the laser heads 250 remove.

The first and second motors 301 and 302 are connected to each end of the first and second lead screws 291 and 292, and rotate the first and second lead screws 291 and 292, respectively. Each one of the first and second motors 301 and 302 is a bidirectional motor, which can rotate in forward and reverse directions.

The second driving means moves the laser heads 250 in a direction different from the driving direction of the first driving means. The second driving means includes a slide member 330, a slide route 340, and a third motor 360. The slide member 330 is connected to both ends of the lead screws 291 and 292, and the first and second guide bars 281 and 282. The slide member 330 slides along the slide route 340, with the result that the laser heads 250 connected to the lead screws 291 and 292, and the first and second guide bars 281 and 282 move. Here, the slide member 330 may be either directly connected to both ends of the lead screws 291 and 292, and the first and second guide bars 281 and 282 or connected to both ends thereof through a predetermined device.

The slide route 340 is a passage on which the slide member is guided, and includes a groove of a shape corresponding to a slide surface of the slide member 330. The third motor 360 provides a power to the slide member 330, so that the slide member 330 slides on the slide route 340. The third motor 360 is also a bidirectional motor as seen in the first and second motors. In the embodiment, although the slide member 330 and the slide route 340 are constructed by a ball busing, the present invention is not limited thereto.

The controller 350 controls the first driving means and the second driving means according to the arranged intervals and a moving path of the laser heads 250. That is, the arranged intervals and a moving path of the laser heads 250 should be changed. Accordingly, when data related to the shape and interval of the frit 230 are inputted to the controller 350, the controller 350 calculates a running path of the laser head 250 to control driving of the motors.

Hereinafter, an operation of the laser irradiation apparatus according to an embodiment of FIG. 3 will be described with reference FIG. 4a to FIG. 6b. When data related to the shape and interval of the frit 230 to be irradiated are inputted to the controller 350, the controller 350 drives the first motor 301, the second motor 302, and the third motor 360, so that the laser heads 250 move in X and Y directions corresponding to the shape of the frit and irradiate a laser to the frit to be melted and cured.

Figure 4A:
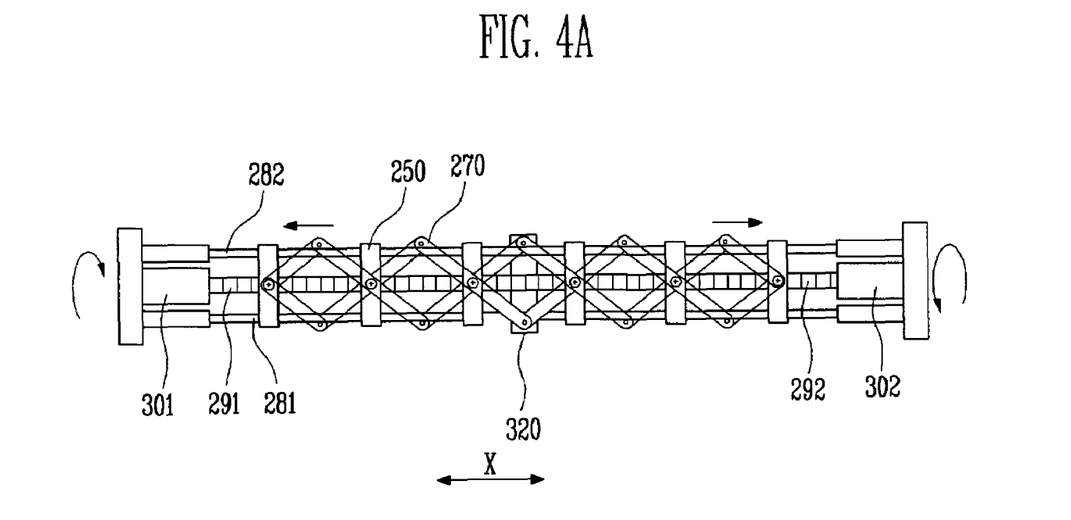
FIGS. 4A and 4B are operational views of adjusting an interval between laser heads in FIG. 3.
Figure 4B:
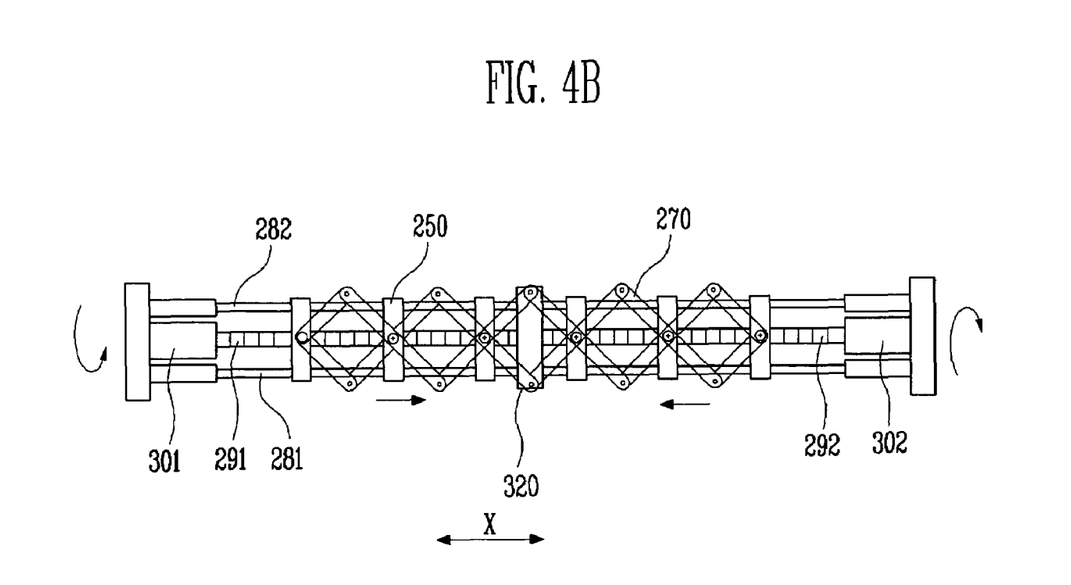

Intervals between the laser heads will be explained with reference to FIG. 4a and FIG. 4b. The intervals between the laser heads 250 are adjusted by rotating the first motor 301 and the second motor 302 in opposite directions to each other. When the first motor 301 and the second motor 302 drive in opposite directions to each other, the laser heads 250 are moved in a center or both sides by the lead screws 291 and 292, and the guide bars 281 and 282. At this time, the cross hanger 270 is constructed by the same units, respective intervals of the laser heads 250 maintain the same size and can be increased or reduced. Accordingly, the intervals of the laser heads 250 can be adjusted corresponding to intervals of the frits, which are continuously formed on a substrate at the same interval.

Figure 5A:
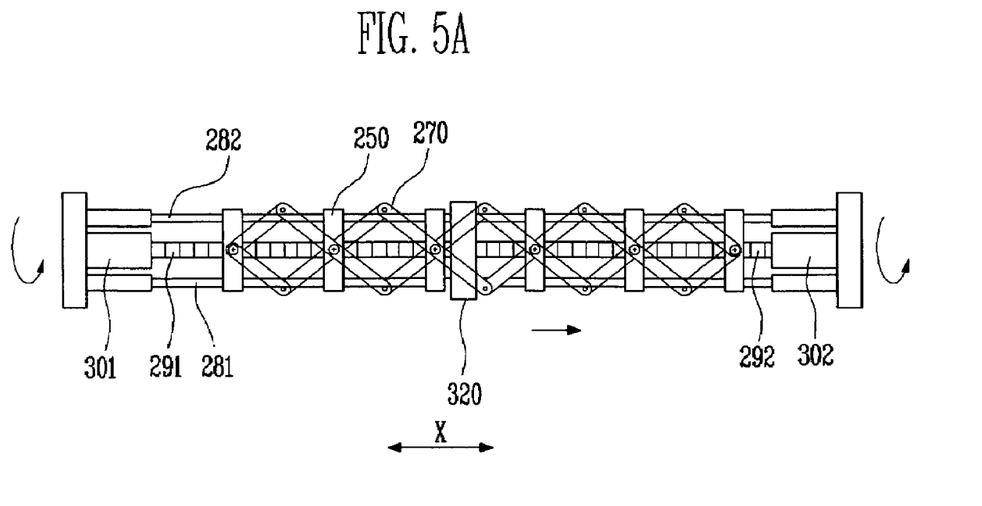
FIGS. 5A and 5B are operational views of adjusting the position of the laser irradiation apparatus of FIG. 3 in an X direction.
Figure 5B:
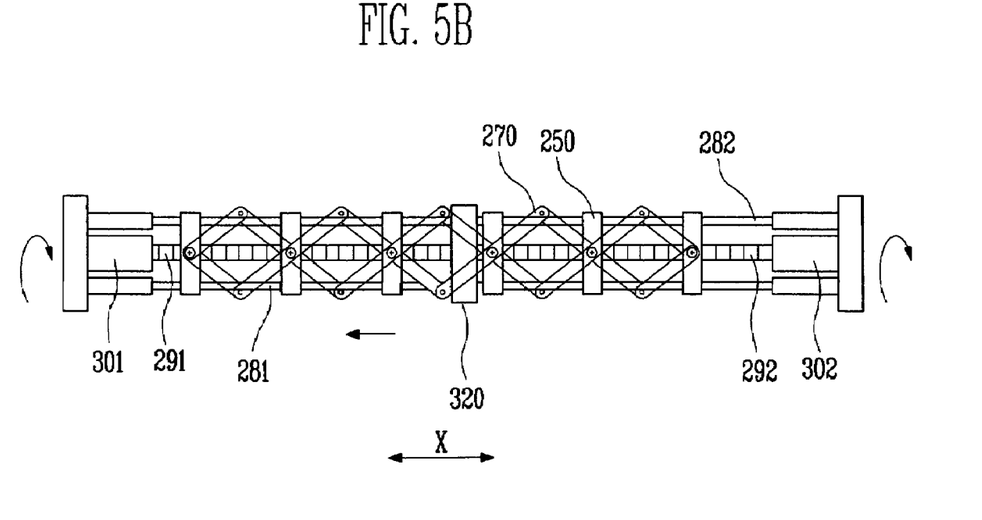

Below, adjustment in the X direction will be described with reference to FIGS. 5A and 5B. Rotating the first motor 301 and the second motor 302 in the same direction achieves an adjustment to the X direction of the laser heads 250. When rotating the first motor 301 and the second motor 302 in the same direction, the laser heads 250 are in the state that the lead screws 291 and 292 penetrate the laser heads 250, so that the laser heads 250 move on the whole. Accordingly, the laser heads 250 can be moved along a transverse line of a square frit 230.

Figure 6A:
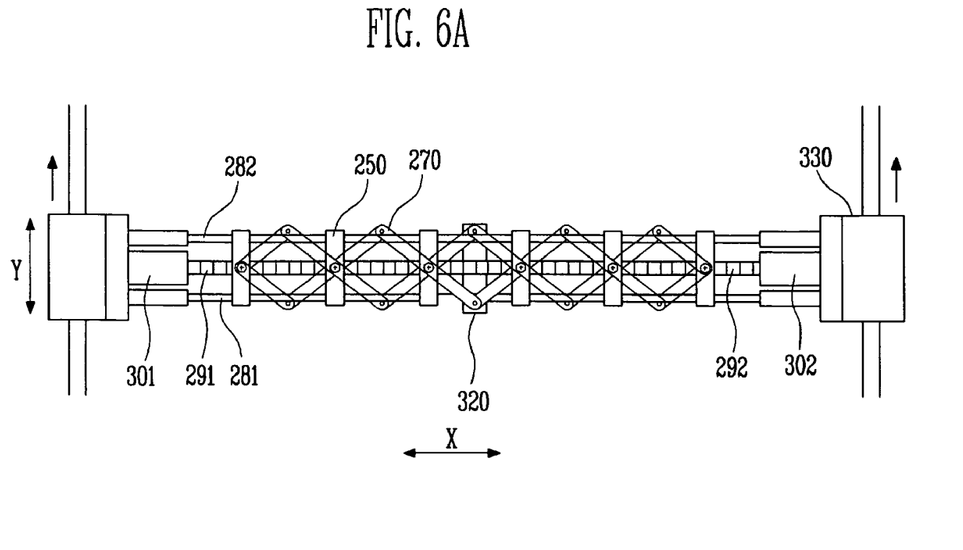
FIGS. 6A and 6B are operational views of adjusting the position of the laser irradiation apparatus of FIG. 3 in a Y direction.
Figure 6B:
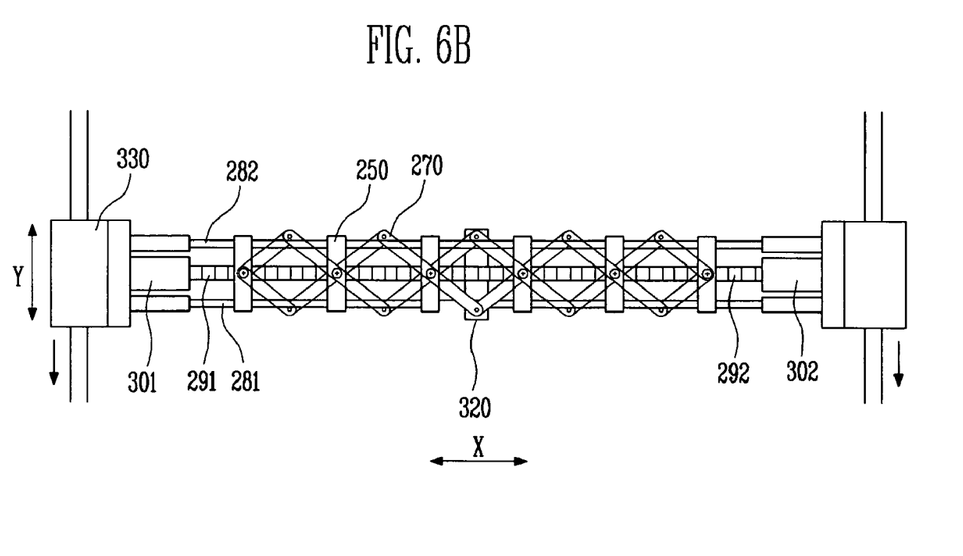

Below, adjustment in the Y direction will be described with reference to FIGS. 6A and 6B. Rotating the third motor 360 achieves an adjustment to the Y direction of the laser heads 250. Namely, driving the third motor 360 moves the slide member 330, so that the laser heads 250 cooperate with the slide member 330 and moves. Accordingly, the laser heads 250 can be moved along a longitudinal line of a square frit 230.

Although a few embodiments of the present invention have been shown and described, it would be appreciated by those skilled in the art that changes might be made in this embodiment without departing from the principles and spirit of the invention, the scope of which is defined in the claims and their equivalents. For example, although a cross hanger is used as an adjustment means of the same interval in the embodiment, an automatic control system for automatically calculating positions of laser heads can be used for the intervals of the laser heads.

What is claimed is:

1. A laser irradiation apparatus comprising:
    a laser oscillator for oscillating a laser;
    a plurality of laser heads for linearly irradiating said laser oscillated by said laser oscillator;
    a first driving means for adjusting arranged intervals of said laser heads, and for moving said laser heads in an X direction; and
    a second driving means for moving said laser heads in a Y direction different from the X direction,
    the first driving means comprising:
        a cross hanger including a plurality of units having an X shape, which continue to be linked for connecting said laser heads to each other;
        a first lead screw formed to penetrate a subset of said plurality of laser heads;
        at least one first guide bar disposed to penetrate said plurality of laser heads and parallel with said first lead screw;
        a first motor for rotating said first lead screw;
        a second lead screw disposed to penetrate the remaining subset of said plurality of laser heads and on an extension line of said first lead screw;
        a second guide bar formed to penetrate said plurality of laser heads and parallel with said second lead screw; and
        a second motor for rotating said second lead screw.

2. The laser irradiation apparatus as claimed in claim 1, wherein an angle of 90 degrees exists between the X and Y directions.

3. The laser irradiation apparatus as claimed in claim 1, wherein units of said cross hanger have the same size.

4. The laser irradiation apparatus as claimed in claim 1, further comprising a connecting member for connecting said first lead screw and said second lead screw to each other while interrupting a supply of a power to said first lead screw and said second lead screw.

5. The laser irradiation apparatus as claimed in claim 1, wherein said second driving means comprises:
    a slide member connected at both ends of a lead screw and a guide bar;
    a slide route, said slide member being guided on said slide route; and
    a third motor for driving said slide member.

6. The laser irradiation apparatus as claimed in claim 1, further comprising a controller for controlling said first driving means and said second driving means according to the arranged intervals and a moving path of said laser heads.

7. A laser irradiation apparatus for irradiating a laser to a fit, which seals an organic emission layer of an organic light emitting display from an outside air, comprising:
    a laser oscillator for oscillating a laser; and
    a plurality of laser heads for irradiating said laser oscillated by said laser oscillator to a plurality of frits formed on a sheet substrate before the organic light emitting display is cut into individual devices,
    a first driver adjusting arranged intervals of said plurality of laser heads, and for driving said plurality of laser heads in an X direction so that said plurality of laser heads move along a line formed by the frits; and
    a second driver moving said plurality of laser heads in a Y direction different from the X direction,
    said first driver comprising:
    a cross hanger to which a plurality of X-shaped units continuing to be linked for connecting said plurality of laser heads to each other;
    a first lead screw formed to penetrate a subset of said plurality of laser heads;
    at least one first guide bar disposed to penetrate a portion of said plurality of laser heads and parallel with said first lead screw;
    a first motor rotating said first lead screw;
    a second lead screw disposed to penetrate the remaining subset of said plurality of laser heads and on an extension line of said first lead screw;
    a second guide bar formed to penetrate a remaining portion of said plurality of laser heads and parallel with said second lead screw; and
    a second motor rotating said second lead screw.

8. The laser irradiation apparatus as claimed in claim 7, wherein units of said cross hanger have the same size.

9. The laser irradiation apparatus as claimed in claim 7, further comprising a connecting member for connecting said first lead screw and said second lead screw to each other while interrupting a supply of a power to said first lead screw and said second lead screw.

10. The laser irradiation apparatus as claimed in claim 7, wherein said second driver comprises:
    a slide member connected at both ends of a lead screw and a guide bar;

a slide route, said slide member being guided on said slide route; and a third motor driving said slide member.

11. The laser irradiation apparatus as claimed in claim 10, wherein said slide member is a ball bushing, and said slide route is a shaft.

12. The laser irradiation apparatus as claimed in claim 7, further comprising a controller for controlling said first driver and said second driver according to the arranged intervals and a moving path of said laser heads.

13. The laser irradiation apparatus as claimed in claim 7, wherein a wavelength of the laser irradiated by the laser irradiation apparatus ranges from 800 nanometers to 1200 nanometers.

14. A laser irradiation apparatus comprising:
   a plurality of laser heads for linearly irradiating an oscillated laser:
   a first unit adjusting arranged intervals of said plurality of laser heads, and moving said plurality of laser heads in a first direction; and
   a second unit moving said plurality of laser heads in a second direction different from the first direction,
   the first unit comprising:
      a cross hanger connecting said plurality of laser heads to each other and accommodating a change in position of said plurality of laser heads;
      a first lead screw formed to penetrate a subset of said plurality of laser heads;
      a first guide bar disposed to penetrate a portion of said plurality of laser heads and parallel with said first lead screw;
      a first motor rotating said first lead screw;
      a second lead screw disposed to penetrate the remaining subset of said plurality of laser heads on an extension line of said first lead screw;
      a second guide bar formed to penetrate the remaining portion of said plurality of laser heads parallel with said second lead screw; and
      a second motor rotating said second lead screw, the relationship between the directional movement of the first and second motors accommodating the adjusting of arranged intervals between said plurality of laser heads and the movement of said plurality of laser heads in the first direction.

15. The laser irradiation apparatus as claimed in claim 14, wherein said second unit comprises:
   a first slide member connected at an end of said first lead screw and said first guide bar and a second slide member connected to the opposite end of said second lead screw and said second guide bar;
   a slide route guiding said first and second slide members; and
   a third motor for driving said slide member.

* * * * *